United States Patent [19]
Wakasa

[11] Patent Number: 5,258,579
[45] Date of Patent: Nov. 2, 1993

[54] WEIGHING METHOD AND WEIGHING APPARATUS

[75] Inventor: Yukio Wakasa, Shiga, Japan

[73] Assignee: Ishida Scales Mfg. Co., Ltd., Kyoto, Japan

[21] Appl. No.: 877,162

[22] PCT Filed: Nov. 16, 1991

[86] PCT No.: PCT/JP91/01571

§ 371 Date: Jul. 2, 1992

§ 102(e) Date: Jul. 2, 1992

[87] PCT Pub. No.: WO92/08959

PCT Pub. Date: May 29, 1992

[30] Foreign Application Priority Data

Nov. 20, 1990 [JP]  Japan ................................. 2-314749

[51] Int. Cl.$^5$ ..................... G01G 19/40; G01G 19/00
[52] U.S. Cl. ................................ 177/25.14; 177/145
[58] Field of Search ........................ 177/25.14, 145

[56] References Cited

U.S. PATENT DOCUMENTS

4,262,763  4/1981  Raskin ............................ 177/4

FOREIGN PATENT DOCUMENTS

59-61719  4/1984  Japan.
61-151430  7/1986  Japan.

*Primary Examiner*—George H. Miller, Jr.
*Attorney, Agent, or Firm*—Staas & Halsey

[57] ABSTRACT

In a weighing apparatus wherein a weighing belt conveyor (10) is supported on a weight detecting device, the present invention is characterized in that an aerodynamic force acting member (17) is provided so as to overlay at least an object (A) to be weighed so that an aerodynamic force such as a buoyance acting on the object (A) can be counterbalanced.

9 Claims, 7 Drawing Sheets

Fig. 10
| Product Number | Height | Transport Speed | Upper Limit of Weight | ---- |
|---|---|---|---|---|
| 001 | 10 | 100 | 48.6 | --- |
| 002 | 5 | 80 | 62.5 | --- |
| 003 | 7 | 100 | 37.4 | |
| | | | | |
Fig. 11
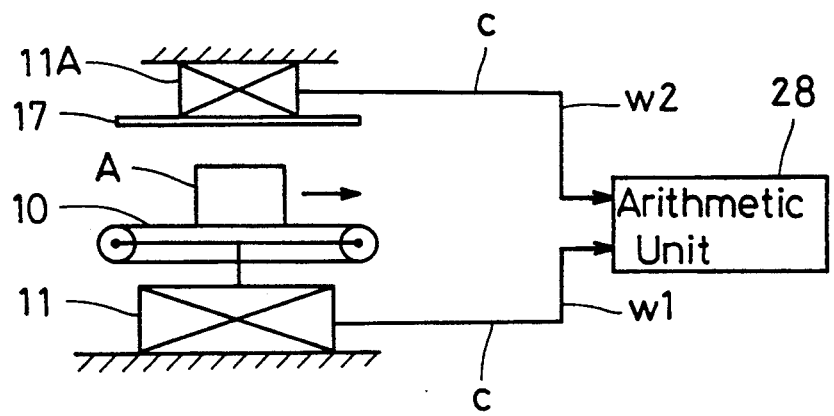
Fig. 12
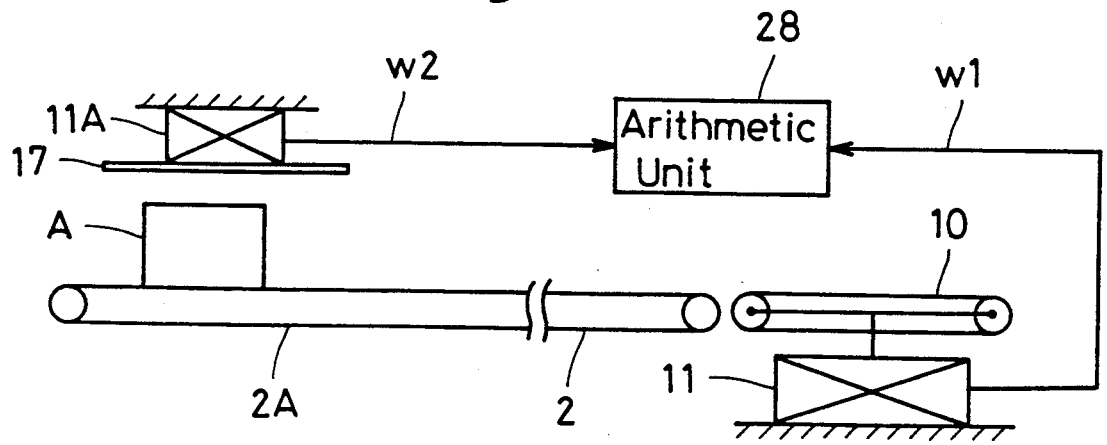

WEIGHING METHOD AND WEIGHING APPARATUS

FIELD OF THE INVENTION

The present invention relates to a weighing method of and an weighing apparatus for weighing an object to be weighed by loading a weighing belt conveyor on a load cell, delivering the object onto a discharge belt conveyor from a delivery belt conveyor and weighing the weight of the object while the latter is transported by means of the weighing belt conveyor.

BACKGROUND ART

In the case where the weight of an object such as, for example, a metered and packaged product, is to be examined, a weighing apparatus is generally used wherein a weighing belt conveyor is loaded on a load cell which is a weight detecting means. While a delivery belt conveyor is arranged on one side of the weighing belt conveyor and a discharge belt conveyor is arranged on the other side of the weighing belt conveyor, the packaged product is delivered onto the weighing belt conveyor and the packaged product of which weight has been measured is subsequently discharged onto the discharge belt conveyor and, if necessary, a sorting device is operated.

However, since this type of weighing apparatus is designed to measure the weight of the object to be weighed during a movement of the object by means of the weighing belt conveyor as described hereinabove, the object tends to receive an aerodynamic force such as a buoyance generated as a result of a difference in speed between the object being moved and air surrounding the object, resulting in a measurement error. Specifically, as the speed of transport of the weighing belt conveyor increases, the measurement error tends to become large.

As a countermeasure, there has been proposed a method of measuring respective weights of a sample of the object held in a stationary state and also in a state of being moved, and then correcting at a data level a measurement error which would occur during the movement of the object to be actually weighed. However, if the shape of a package of the object and/or the interval between the successively transported objects vary, a change may occur in the flow of air and, for this reason, the magnitude of an aerodynamic force varies accordingly. Consequently, there has been a problem in that a measurement error occurs.

Also, for minimizing the difference in speed between the object to be weighed and the air around the object, a method has been proposed wherein air is blown in a direction conforming to the direction of transportation of the object to be weighed. However, this method has a problem in that, since it is extremely difficult to make the flow of the air uniform, a wind pressure may act on the object being weighed and/or the weighing belt conveyor, resulting in a varying result of measurement.

The present invention has been devised with due regards paid to those problems and is intended to provide a weighing method of and a weighing apparatus wherein, regardless of the speed of transportation of the weighing belt conveyor, the size of the object to be weighed and the shape of the package, any possible measurement error attributable to the aerodynamic force such as the buoyance generated during the transportation can be minimized.

DISCLOSURE OF THE INVENTION

In order to accomplish the above described object, a weighing method of the present invention is such that, with the use of an weighing apparatus which, while the weighing belt conveyor is loaded on a weight detecting means, measures the weight of the object while the object is transported placed on the belt, each time the object is transported, an aerodynamic force which corresponds to a weight component of the aerodynamic force acting on the object is measured so that the weight of the object can be corrected with the measured value.

According to this weighing method, since each time the object is transported an aerodynamic force which corresponds to a weight component of the aerodynamic force acting on the object is measured, it can be accurately measured even though the aerodynamic force such as the buoyance varies due to the speed of transportation and/or the shape of the package. Accordingly, by correcting the weight of the object with the measured value of the aerodynamic force, the actual weight of the object can be accurately measured.

Also, a weighing apparatus of the present invention has the weighing belt conveyor for transporting the object to be weighed, which is loaded on the weight detecting means, and is provided with a correcting means for correcting the weight of the object by receiving an aerodynamic force which corresponds to a weight component of the aerodynamic force acting on the object during a transportation of the object by means of a belt conveyance device including the weighing belt conveyor.

According to this weighing apparatus, by causing the correcting means to receive the aerodynamic force corresponding to the weight component of the aerodynamic force acting on the object being then transported, the weight is corrected with due regards paid to this aerodynamic force. Accordingly, after all, any possible measurement error attributable to the aerodynamic force such as the buoyance can be minimized.

In one preferred embodiment of the present invention, the correcting means includes an aerodynamic force acting member positioned above the object being transported by means of the weighing belt conveyor, and means for loading the aerodynamic force acting member on said weight detecting means.

According to this embodiment, when the object to be weighed is transported, a difference in speed occurs between the object and the air surrounding the object, resulting in that the pressure adjacent a top surface of the object becomes lower than the pressure of the surrounding air. The aerodynamic force mainly attributable to this difference in pressure acts on the top surface of the object being weighed and a lower surface of the aerodynamic force acting means. Accordingly, since this aerodynamic force acts on the object being weighed and the aerodynamic force acting member in respective directions counter to each other, the aerodynamic force can be counterbalanced when the aerodynamic force acting member is loaded on the weight detecting means, and therefore, any possible measurement error attributable to the aerodynamic force such as the buoyance can be minimized.

In one preferred embodiment of the present invention, the aerodynamic force acting member has support lugs through which the aerodynamic force acting member is supported by the weighing belt conveyor.

Also, in one preferred embodiment of the present invention, the aerodynamic force acting member is so formed as to represent a tunnel through which the object to be weighed is transported.

In another preferred embodiment of the present invention, the aerodynamic force acting member is so formed as to represent a plate, sheet or fabric.

In a further preferred embodiment of the present invention, there is provided a height adjustment device for adjusting a height of the aerodynamic force acting member above the weighing belt conveyor.

In this embodiment, since the height of the aerodynamic force acting member above the belt conveyor is made adjustable, the aerodynamic force acting member can be brought close towards the object to be weighed and to a position at which the aerodynamic force can easily be detected, and therefore, any possible measurement error can further be minimized.

Again, depending on the necessity, it is preferred that the apparatus is provided with a drive device for driving the height adjustment device and a control device for controlling the drive device according to the height of the object to be weighed.

In this case, since the aerodynamic force acting member can be automatically brought close towards the object to be weighed in dependence on the height of such object, a weighing operation can be facilitated.

Furthermore, in an embodiment of the present invention, the correcting means is provided with an aerodynamic force acting member positioned above the object being transported by a belt conveyance device including the weighing belt conveyor, an additional weight detecting device for detecting an aerodynamic force acting on the aerodynamic force acting member, and an arithmetic unit. The arithmetic unit is used to calculate the actual weight of the object on the basis of a weight signal generated from both of the weight detecting means.

In this embodiment, while the object to be weighed is transported by means of the belt conveyance device including the weighing belt conveyor, the aerodynamic force such as the buoyance acting on the object is detected by the additional weight detecting means through the aerodynamic force acting member and, on the basis of the weight signal generated from both of the weight detecting means, the arithmetic unit calculates the actual weight of the object, and therefore, the actual weight can be accurately determined.

BRIEF DESCRIPTION OF THE DRAWINGS

FIG. 10 is a chart showing data inputted to a control device;

FIG. 11 is a schematic structural diagram showing a sixth embodiment of the present invention; and FIG. 12 is a schematic structural diagram showing a seventh embodiment of the present invention.

BEST MODE FOR CARRYING OUT THE INVENTION

Hereinafter, the present invention will be described in connection with preferred embodiments thereof.

Figure 1:
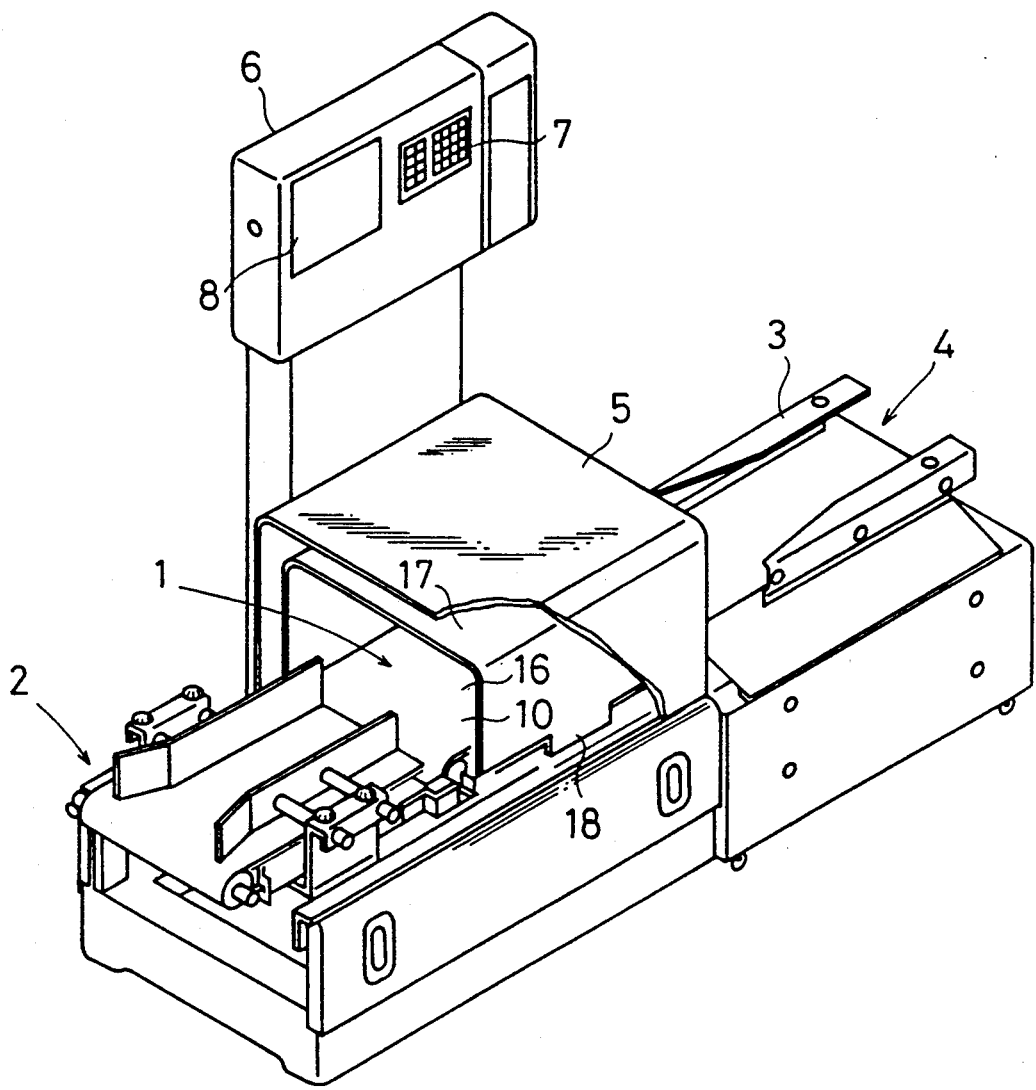
FIG. 1 is a perspective view of a weighing apparatus according to a first embodiment of the present invention.
Figure 2:
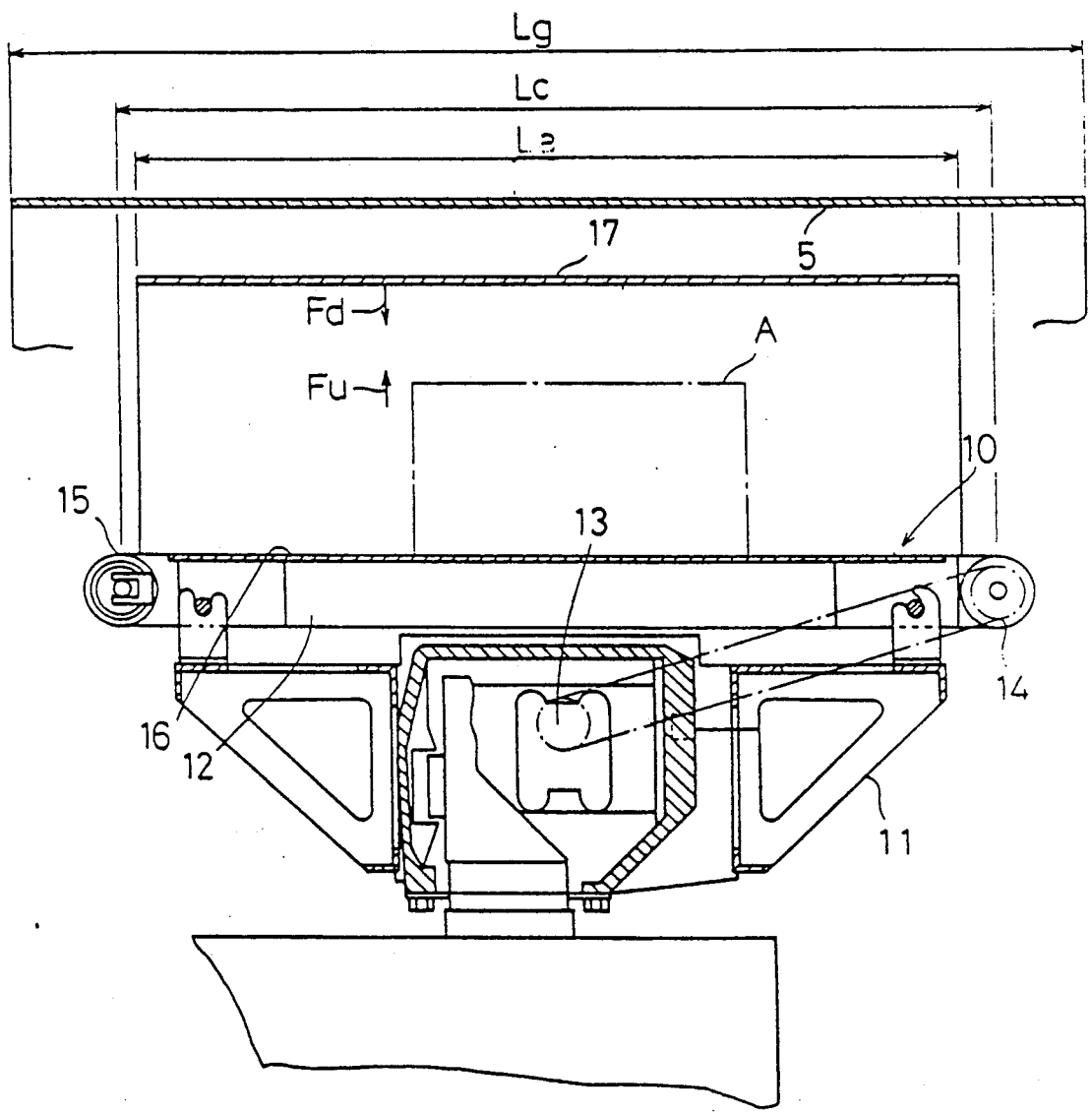
FIG. 2 is a sectional view showing an essential portion of the present invention.
Figure 3:
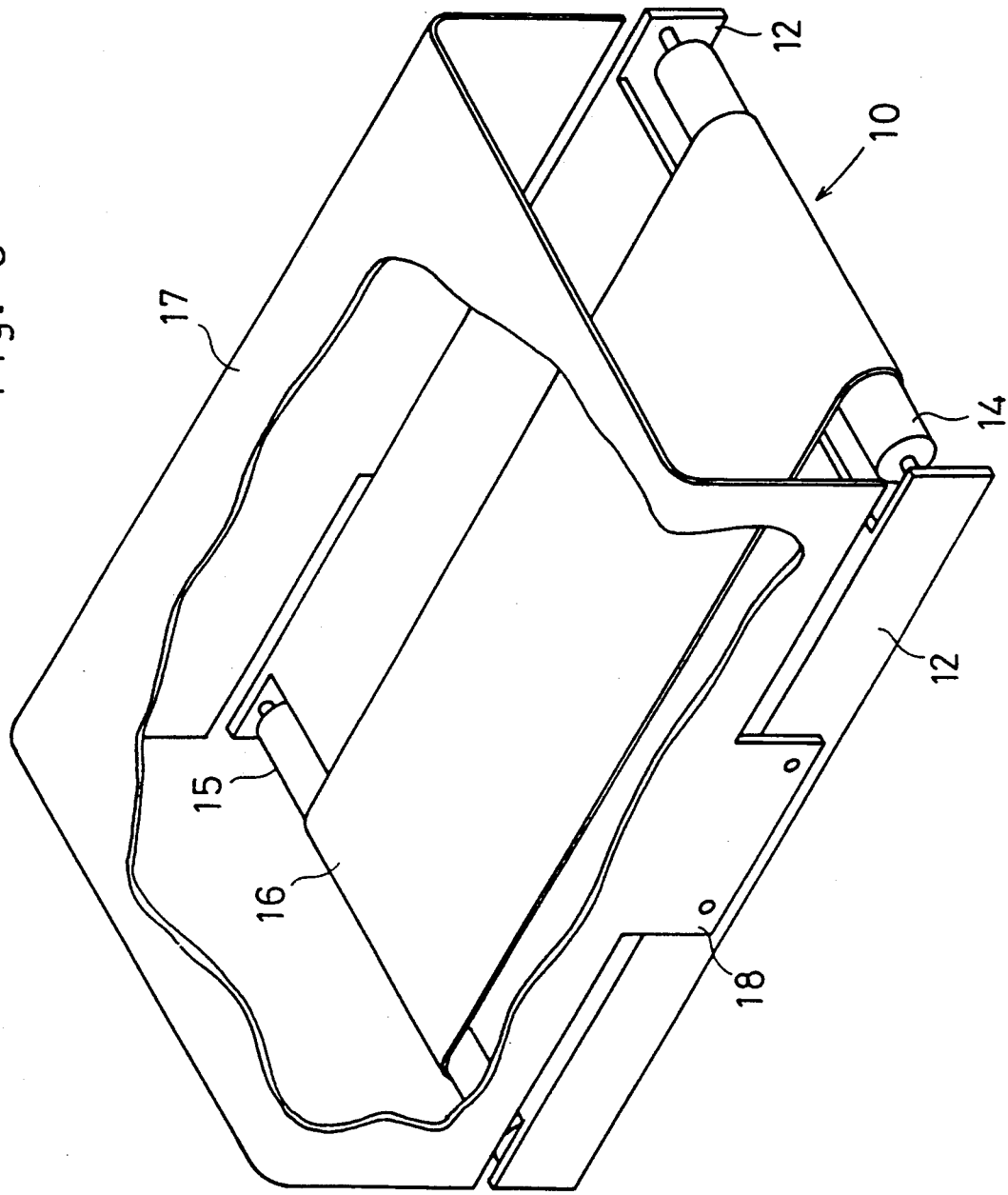
FIG. 3 is a perspective view of the essential portion of the present invention showing an aerodynamic force acting member with a portion thereof cut away.

FIGS. 1 to 3 illustrate a first embodiment of the present invention.

Referring to FIG. 1, A weighing apparatus 1 has an infeed section provided with a delivery belt conveyor 2 for delivering an object A to be weighed (FIG. 2) and also has an outfeed section provided with a discharge belt conveyor 4 arranged linearly and provided with a sorting unit 3. A control device 6 includes a keyboard 7 through which parameters representative of measuring conditions are inputted, and a display device 8 for a visual representation of results of measurement.

FIG. 2 illustrates one example of the weighing apparatus.

In this figure, a weighing belt conveyor 10 includes a frame structure 12 fixedly mounted on a weight detecting device (weight detecting means) 11 and loaded on the weight detecting device 11. The frame structure 12 is provided at one end thereof with a drive roller 14 coupled with a motor 13 and at the other end thereof with an idle roller 15, and a belt 16 is trained between these rollers 14 and 15.

Disposed above the weighing belt conveyor 10 is an aerodynamic force acting member 17. This aerodynamic force acting member 17 overlays an object A to be weighed that is being conveyed by the weighing belt conveyor 10 so that, as will be described later, the aerodynamic force acting member 17 can receive an aerodynamic force corresponding to a weight component (counterbalancing component) which is portion of the aerodynamic force acting on the object A to be weighed during the conveyance thereof by means of the weighing belt conveyor 10. It is to be noted that, in the case of the embodiment now under discussion, the aerodynamic force acting member 17 has a length La which is, for example, so chosen as to be substantially equal to the length Lc of the weighing belt conveyor 10.

Referring now to FIG. 3, the above described aerodynamic force acting member 17 is so designed and so structured as to represent a generally tunnel-like configuration through which the object A to be weighed can pass, and has a pair of support lugs 18 through which the aerodynamic force acting member 17 is fixed to the frame structure 12 of the weighing belt conveyor 10 and is then loaded on the weight detecting device 11 (FIG. 2). In the case of the embodiment now under discussion, the aerodynamic force acting member 17 is, as shown in FIG. 1, covered by a windshield 5. The windshield 5 serves to prevent air (wind) flowing inside a room, in which the weighing apparatus is installed, from impinging upon the aerodynamic force acting member 17 and, as shown in FIG. 2, has a length Lg so chosen as to be greater than any one of the length La of the aerodynamic force acting member 17 and the length Lc of the weighing belt conveyor 10.

It is to be noted that, in the embodiment now under discussion, the aerodynamic force acting member 17 capable of receiving the aerodynamic force and the support tubs 18, which serve as a means for loading on the weight detecting device 11 the aerodynamic force received by the aerodynamic force acting member 17, constitute a correcting means for correcting the weight of the object A to be weighed.

The principle of the present invention will be described hereinafter.

When the object A to be weighed is transported by the belt 16, a difference in speed is created between the object A to be weighed and air surrounding it so that a pressure acting on a top surface of the object A to be weighed becomes lower than the pressure of the surrounding air, and accordingly, an aerodynamic force, for example, a buoyance Fu, acts on the object A to be weighed, resulting in an apparent reduction in weight of the object A to be weighed. On the other hand, since the aerodynamic force acting member 17 is disposed so as to overlay the proximity of the top surface of the object A to be weighed, the aerodynamic force acting member 17 can receive a force Fd acting to draw the aerodynamic force acting member downwardly, said force Fd being of a magnitude substantially equal to the buoyance Fu. The force acting on the aerodynamic force acting member 17 is transmitted to the weight detecting device 11 through the support lugs 18 and the frame structure 12. Therefore, a decrement (Fu) of the weight of the object A to be weighed and an increment (Fd) of the weight of the aerodynamic force acting member 17 act on the weight detecting device 11 through the frame structure 12, permitting the weight detecting device 11 to measure the weight which is equal to the actual weight of the object A to be weighed in a stationary state.

In the above described construction, of the aerodynamic force acting on the object A to be weighed each time the object A is transported, only a weight component thereof is measured and, therefore, even though the speed of transport and/or the outer appearance of the object A to be weighed vary accompanied by a change in magnitude of the buoyance Fu acting on the object A to be weighed, a load substantially equal thereto acts on the aerodynamic force acting member 17 so as to counterbalance with the buoyance Fu acting on the object A to be weighed. In view of this, any possible error in measurement of the weight resulting from the aerodynamic force such as the buoyance produced during the transportation can be minimized.

In the meantime, when the object A to be weighed was measured without the use of the aerodynamic force acting member 17, an error of −0.71 gram was found with respect to the weight the object A held in a stationary state. On the other hand, when the same object A was weighed with the use of the aerodynamic force acting member 17, an error of −0.01 gram was found. Thus, it has been found that the use of the aerodynamic force acting member 17 is extremely advantageous in reducing the error and is extremely effective to the weighing apparatus of a type requiring a capability of weighing in a precision of 0.1 gram.

It is to be noted that, in the case of the embodiment now under discussion, since the use has been made of the windshield 5, and even though an air flow occurs from a lateral direction with respect to the direction of transport by the weighing belt conveyor 10, the windshield 5 is effective to shield the lateral air flow thereby to improve the weighing precision. However, it is obvious that the windshield 5 is dispensable.

Hereinafter, some other embodiments will be described with reference to FIGS. 4 to 12.

It is to be noted that, in each of the following embodiments, elements alike those used in the first embodiment are designated by like reference numerals used in connection with the first embodiment and, hence, only differences will be described.

Figure 4:
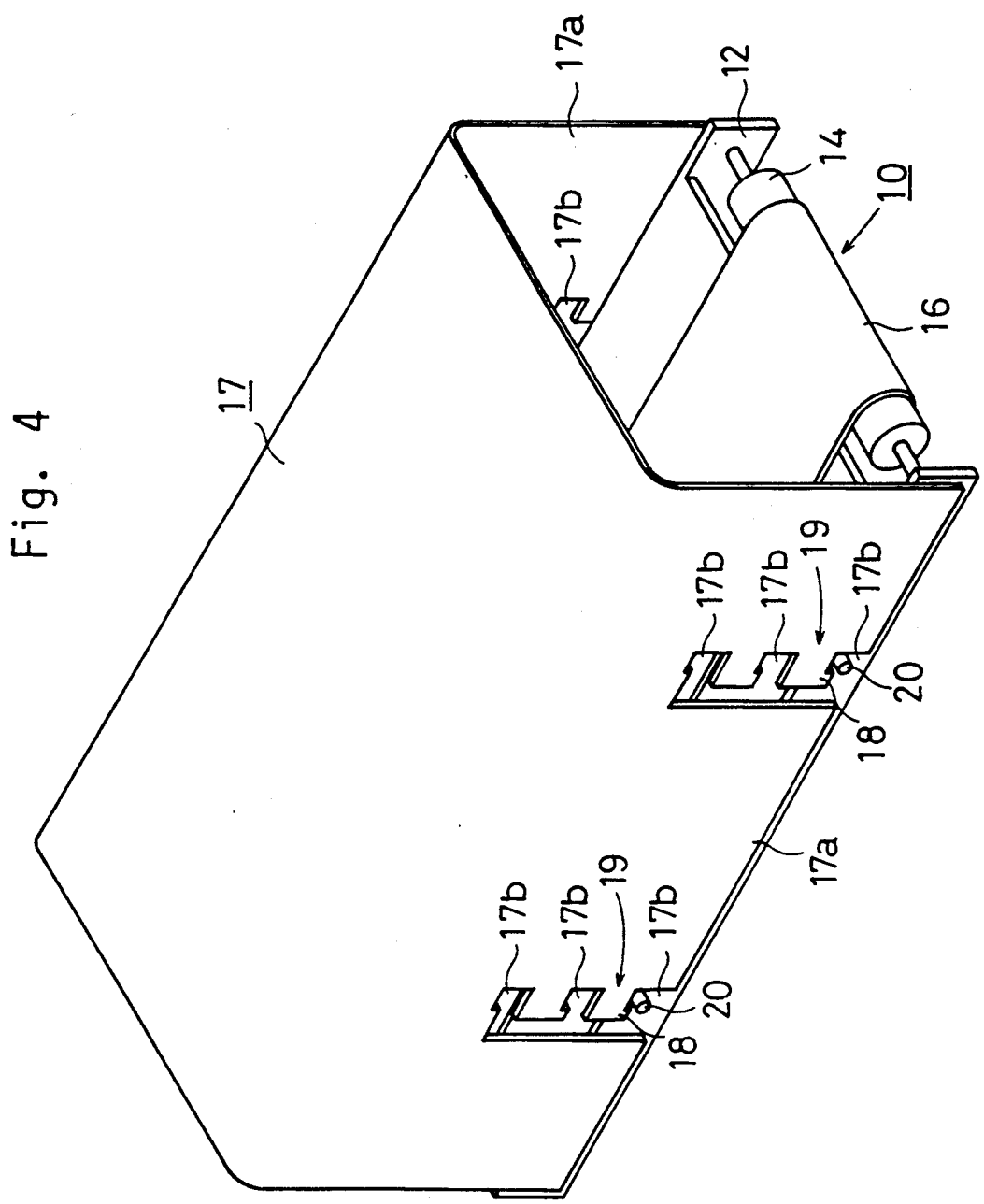
FIG. 4 is a perspective view of the aerodynamic force acting member and associated parts according to a second embodiment of the present invention.

Referring to FIG. 4, the embodiment shown therein is provided with an adjustment device 19 for making the height of the aerodynamic force acting member 17 adjustable above the belt 16 of the weighing belt conveyor 10. In other words, the frame structure 12 has its opposite sides provided with pins 20, while the aerodynamic force acting member 17 is formed at a lower portion of each of the opposite side faces 17a with a plurality of engagement holes 17b engageable with the corresponding pin 20 to support the aerodynamic force acting member 17, said engagement holes 17b in each side face 17b being positioned one above the other in a vertical direction. According to this embodiment, by suitably selecting the position of one the engagement holes 17b to be engaged with the respective pin 20, the height of the aerodynamic force acting member 17 above the weighing belt conveyor 10 can be selected to one of, for example, three height levels. Because of this, even though the height of the object A to be weighed varies, a suitable setting of a space between the object A to be weighed and the aerodynamic force acting member 17 makes it possible to substantially equalize the buoyance Fu, acting on the object A to be weighed, to the absolute value of the drag force Fd acting on the aerodynamic force acting member 17. Accordingly, even though the height of the object A to be weighed varies, a high weighing precision can be maintained.

Figure 5:
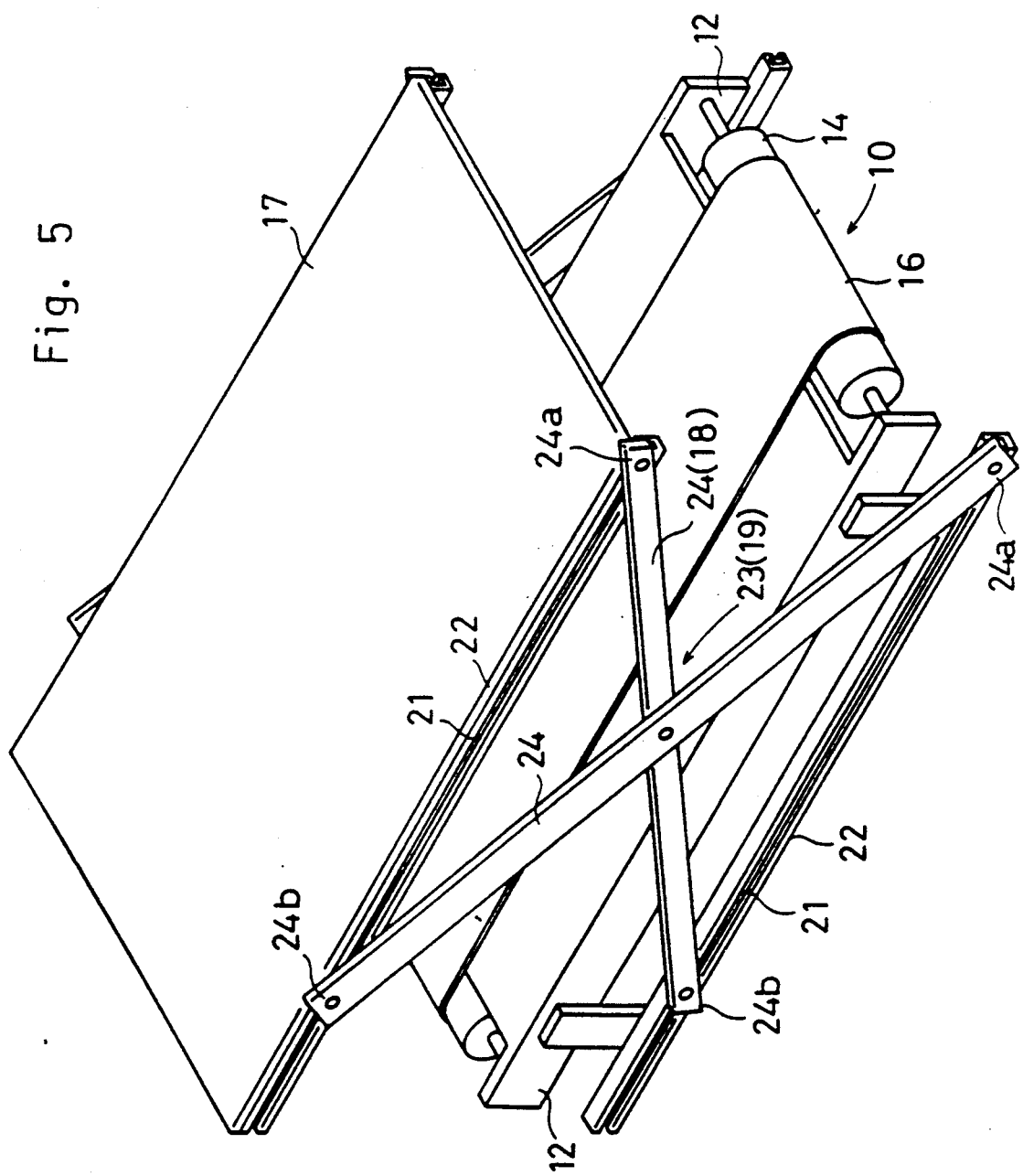
FIG. 5 is a perspective view of the aerodynamic force acting member and associated parts according to a third embodiment of the present invention.

FIG. 5 illustrates an essential portion of a third embodiment.

Figure 6:
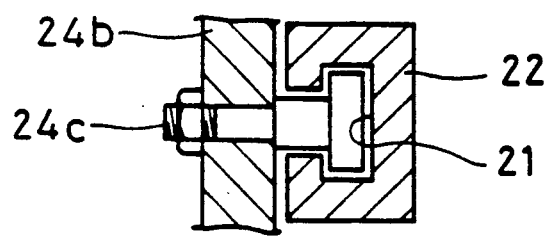
FIG. 6 is a sectional view showing a left-hand end of one of links used therein.

In this embodiment, the aerodynamic force acting member 17 is in the form of a plate configuration. Rails 22 each having a guide groove 21 defined therein is secured to each of opposite side faces of the aerodynamic force acting member 17 and each of opposite side faces of the frame structure 12, respectively. Provided between the rails 22 secured to the frame structure 12 and the rails 22 secured to the aerodynamic force acting member 12 are respective pantographs 23 (adjustment device 19). Right-hand ends 24a of respective links 24 (support lugs 18) forming each of the pantographs 23 are secured to the associated rails 22 while left-hand ends 24b thereof are slidably connected to the associated rails 22 by means of respective headed bolts 24c as shown in FIG. 6. Thus, when the adjustment device 19 constituted by the pantographs 23 of FIG. 5 is manually operated, the height of the aerodynamic force acting member 17 can be indefinitely varied.

Figure 7:
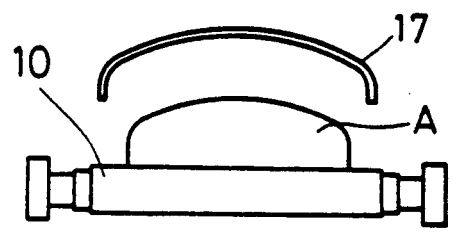
FIG. 7 is a front elevational views showing a modified form of the aerodynamic force acting member.

It is to be noted that, although in the foregoing embodiment the aerodynamic force acting member 17 has been in the form of the plate configuration, it may be of a shape curved to follow the shape of the top surface of the object A to be weighed as shown by a modification shown in FIG. 7. Also, the aerodynamic force acting member 17 may be constituted, not by a flat plate, but by a corrugated plate.

Figure 8:
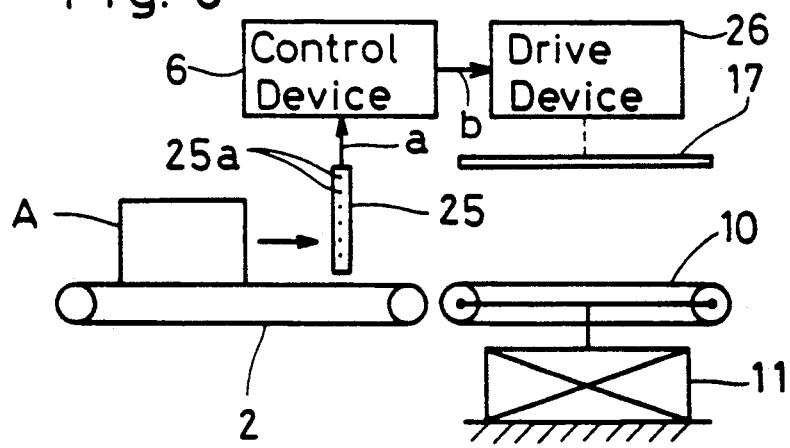
FIG. 8 is a schematic structural diagram showing a fourth embodiment of the present invention.

FIG. 8 illustrates a fourth embodiment.

In this figure, a frame structure (not shown) for the delivery belt conveyor 2 has a height detecting device 25 fixed thereto. The height detecting device 25 comprises a plurality of photosensors 25a spaced a distance from each other in a vertical direction, each of said photosensors 25a including a beam projector and a beam receiver that are disposed on respective sides of the delivery belt conveyor 2 in alignment with each other. The height of the object A to be weighed can be detected by the position of one of the photosensors 25a whose beam receiver has received a beam of light projected by the corresponding beam projector without being intercepted by the object A being weighed. A control device 6 receives, as an input signal, a height signal a generated from the height detecting device 25 and outputs a motor drive signal b to a drive device 26. In response to the motor drive signal b indicative of the number of revolution of a motor, the drive device 26 varies the height of the aerodynamic force acting member 17. It is to be noted that, although not shown, the drive device 26 is provided with a stepper motor and bevel gears so that the left-hand ends 24b of the associated links 24 shown in FIG. 5 can be moved horizontally.

According to the embodiment of FIG. 8, since the aerodynamic force acting member 17 can be automatically brought to a position close to the object A being weighed in correspondence with the height of the object A to be weighed thereby to adjust to an appropriate value the space between the aerodynamic force acting member 17 and the object A in the vertical direction, the weighing operation can be facilitated.

It is also to be noted that, although in the foregoing embodiment the height detecting device 25 has been used to detect the height of the object A to be weighed, the height of the object A to be weighed need not be necessarily detected. An example of this will now be shown as a fifth embodiment with reference to FIG. 9.

Figure 9:
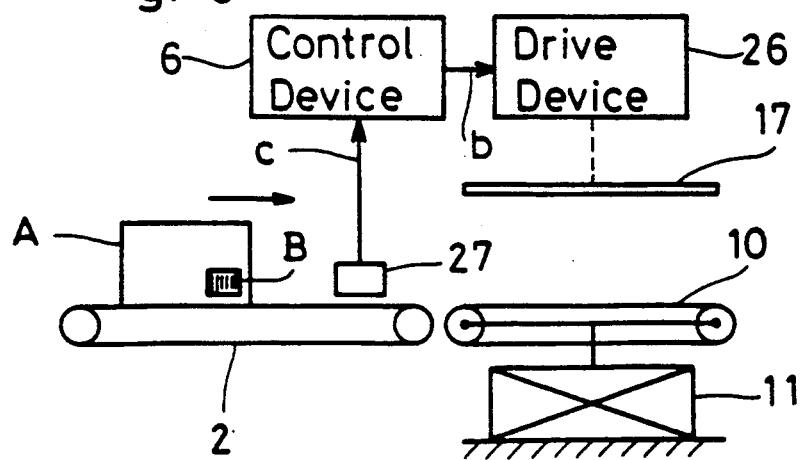
FIG. 9 schematic structural diagram showing a fifth embodiment of the present invention.

Referring to FIG. 9, the weighing belt conveyor 10 has an upstream side provided with a bar code reader 27. This bar code reader 27 is used to read a bar code B affixed to the object A to be weighed. The bar code B is recorded with information including a product number and others and, on the other hand, the object A to be weighed has a specific height for a particular product number as shown in FIG. 10. The data shown in FIG. 10 are inputted to and stored in the control device 6 in FIG. 9. In this embodiment, the control device 6 receives a signal c from the bar code reader 27 which is indicative of the particular product number and then varies, in a manner similar to that described previously, the height of the aerodynamic force acting member 17 according to the particular height of the object A to be weighed.

It is to be noted that a recognition of the height according to the above described product number may be carried out also at a transport process upstream of the delivery belt conveyor 2 so that the height can be adjusted by tracking the object A to be weighed.

It is also to be noted that, in any one of the foregoing embodiments, the aerodynamic force acting member 17 has been supported on the frame structure 12 of the weighing belt conveyor 10 as shown in FIG. 2, the aerodynamic force acting member 17 may be directly mounted on the weight detecting device 11 so as to impose a load thereon.

Again, in any one of the foregoing embodiments, the aerodynamic force acting member 17 has been loaded on the weight detecting device 11 which is loaded with the weighing belt conveyor 10. However, the aerodynamic force acting member 17 may be loaded on any other weight detecting device. An example of this will now be described as a sixth embodiment with reference to FIG. 11.

Referring now to FIG. 11, the aerodynamic force acting member 17 is suspended from above by an additional weight detecting device 11A. The weight detecting device 11 is used to detect the object A to be weighed, the weighing belt conveyor 10 and the buoyance acting on the object A to be weighed, while the additional weight detecting device 11A is used to detect the aerodynamic force acting member 17 and the aerodynamic force acting on the aerodynamic force acting member 17. The weight detecting devices 11 and 11A provide respective weight signals w1 and w2 to an arithmetic unit 28. The arithmetic unit 28 makes use of the weight signals w1 and w2 to perform a calculation of (w1 + w2 = A) to calculate the actual weight of the object A.

It is to be noted that, in this embodiment, the aerodynamic force acting member 17, the additional weight detecting device 11A and the arithmetic unit 28 constitute the correcting means.

It is also to be noted that the additional weight detecting device 11A may not necessarily be arranged at a position adjacent the weighing belt conveyor 10, but may be delivery belt conveyor 2 or an infeed belt conveyor 2A (belt conveyance device) positioned upstream of the belt conveyor 2. In other words, the present invention serves the purpose if, each time the object A to be weighed is conveyed, the aerodynamic force which corresponds to the weight component (buoyance) of the aerodynamic force Fu acting on the object A being conveyed is measured at a position adjacent any one of the infeed belt conveyor 2A, the delivery belt conveyor 2 and the weighing belt conveyor 10 (belt conveyance device) so that the weight of the object A having been weighed can be corrected with the measured value (corresponding to the signal w1).

It is to be noted that the aerodynamic force may not be always limited to the buoyance Fu and, depending on the shape of the object A to be weighed, a descent force acting to suppress the object A may act on the object A.

INDUSTRIAL APPLICABILITY

The present invention can be utilized as a weighing apparatus for measuring the weight of the object to be weighed such as, for example, a metered and packaged product while the latter is being transported by a belt conveyor.

What is claimed is:

1. A method of weighing an object to be weighed by measuring the weight of the object while the object is being transported by means of a belt of a weighing apparatus in which a weighing belt conveyor is loaded on a weight detecting means, characterized in that, each time the object is transported, an aerodynamic force which corresponds to a weight component of the aerodynamic force acting on the object is measured so that the weight of the object can be corrected with the measured value.

2. A weighing apparatus which comprises a weighing belt conveyor for transporting an object to be weighed, said weighing belt conveyor being loaded on a weight detecting means, characterized in that there is provided a correcting means for correcting the weight of the object by receiving an aerodynamic force which corresponds to a weight component of the aerodynamic force acting on the object during a transportation of the object by means of a belt conveyance device including the weighing belt conveyor.

3. The weighing apparatus as defined in claim 2, wherein said correcting means includes an aerodynamic force acting member positioned above the object being transported by means of the weighing belt conveyor, and means for loading the aerodynamic force acting member on said weight detecting means.

4. The weighing apparatus as defined in claim 3, wherein said aerodynamic force acting member has support lugs through which said aerodynamic force acting member is supported by the weighing belt conveyor.

5. The weighing apparatus as defined in claim 3, wherein said aerodynamic force acting member is in the form of a tunnel through which the object to be weighed is transported.

6. The weighing apparatus as defined in claim 3, wherein said aerodynamic force acting member is in the form of a plate, sheet or fabric.

7. The weighing apparatus as defined in claim 3, wherein there is provided a height adjustment device for adjusting a height of the aerodynamic force acting member above the weighing belt conveyor.

8. The weighing apparatus as defined in claim 7, wherein there is provided a drive device for driving the height adjustment device and a control device for controlling the drive device according to the height of the object to be weighed.

9. The weighing apparatus as defined in claim 2, wherein said correcting means comprises an aerodynamic force acting member positioned above the object being transported by a belt conveyance device including the weighing belt conveyor, an additional weight detecting device for detecting an aerodynamic force acting on the aerodynamic force acting member, and an arithmetic unit for calculating the actual weight of the object on the basis of a weight signal generated from both of said weight detecting means.

* * * * *

UNITED STATES PATENT AND TRADEMARK OFFICE
CERTIFICATE OF CORRECTION

PATENT NO. : 5,258,579
DATED : November 2, 1993
INVENTOR(S) : Yukio Wakasa

It is certified that error appears in the above-indentified patent and that said Letters Patent is hereby corrected as shown below:

Col. 5, line 27, after "member" insert --17--.

Col. 8, line 29, after "may be" insert --arranged, as shown in Fig. 12, at a position adjacent the--

Signed and Sealed this

Twelfth Day of July, 1994

Attest:

BRUCE LEHMAN

Attesting Officer     Commissioner of Patents and Trademarks